Figure 1:
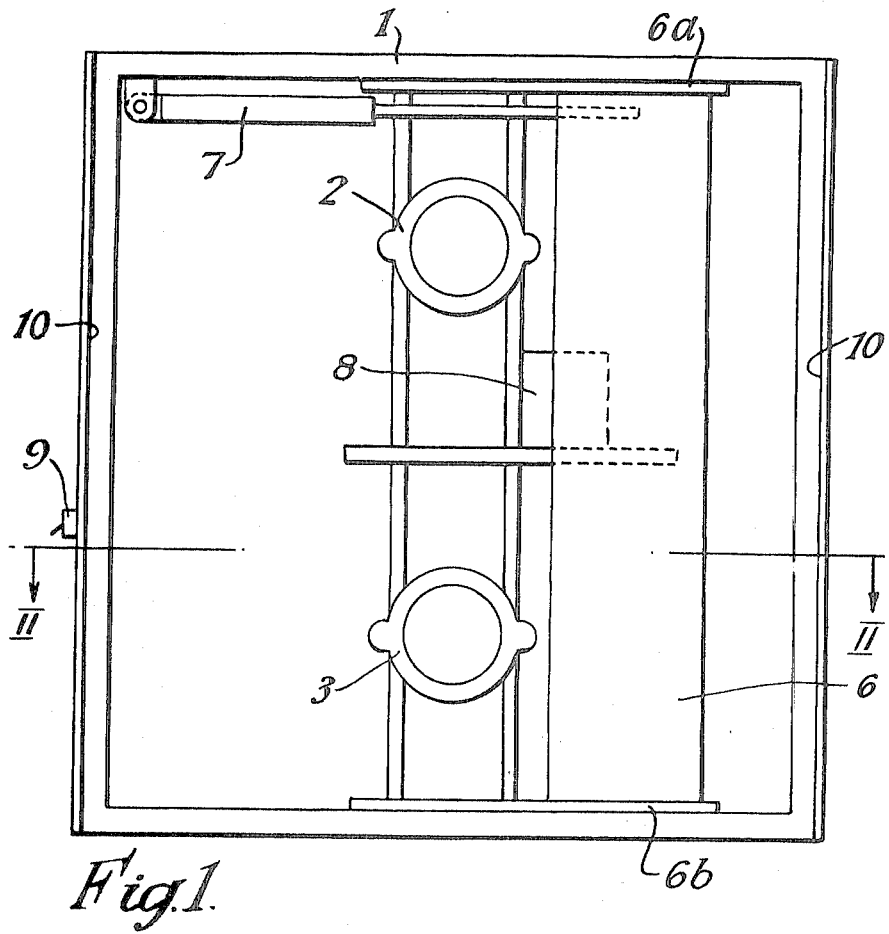

United States Patent

Bunting et al.

[15] 3,645,498
[45] Feb. 29, 1972

[54] COUPLING STATION

[72] Inventors: Arthur Bunting, Gillingham; Arthur Victor Heighton, Ongar, both of England

[73] Assignees: Hall-Thermotank International Limited; Overseas Containers Limited, London, England

[22] Filed: Oct. 23, 1969

[21] Appl. No.: 868,733

[30] Foreign Application Priority Data

Oct. 24, 1968 Great Britain ............... 45,228/68

[52] U.S. Cl. .................................. 251/159, 251/147
[51] Int. Cl. ................................................ F16k 5/14
[58] Field of Search ............... 251/149.3, 147, 158, 159; 138/94; 285/300, 302; 137/625.18

[56] References Cited

UNITED STATES PATENTS

| 2,977,085 | 3/1961 | Roberts | 251/149.3 |
| 3,109,457 | 11/1963 | Oliveau | 137/625.18 |
| 3,503,421 | 3/1970 | Benedetti | 137/625.4 |

FOREIGN PATENTS OR APPLICATIONS

| 674,771 | 7/1952 | Great Britain | 251/159 |
| 825,944 | 12/1959 | Great Britain | 251/159 |
| 1,213,058 | 10/1959 | France | 251/159 |
| 1,264,881 | 5/1961 | France | 251/158 |
| 1,318,759 | 1/1963 | France | 251/159 |

Primary Examiner—William R. Cline
Attorney—Michael S. Striker

[57] ABSTRACT

A coupling station for coupling an air duct to an airport of a cargo container which comprises a coupling member movable in the direction of airflow therethrough between extended and retracted positions and a closure plate for sealing the open end of the coupling member, the closure plate moving in a plane normal to the direction of extension and retraction of the coupling member, the closure plate moving in a plane normal to the direction of extension and retraction of the coupling member in a plane located between the extended and retracted positions. The coupling station may be provided with automatic control from a two-position switch which when moved into a first position from a second position retracts the coupling member, then moves the closure plate to the open position and finally extends the coupling member and when moved into the second position from the first position retracts the coupling member, then moves the closure plate into the closed position and finally extends the coupling member.

8 Claims, 3 Drawing Figures

INVENTOR
ANTHONY BUNTING
BY ARTHUR VICTOR HEIGHTON

ATTORNEY

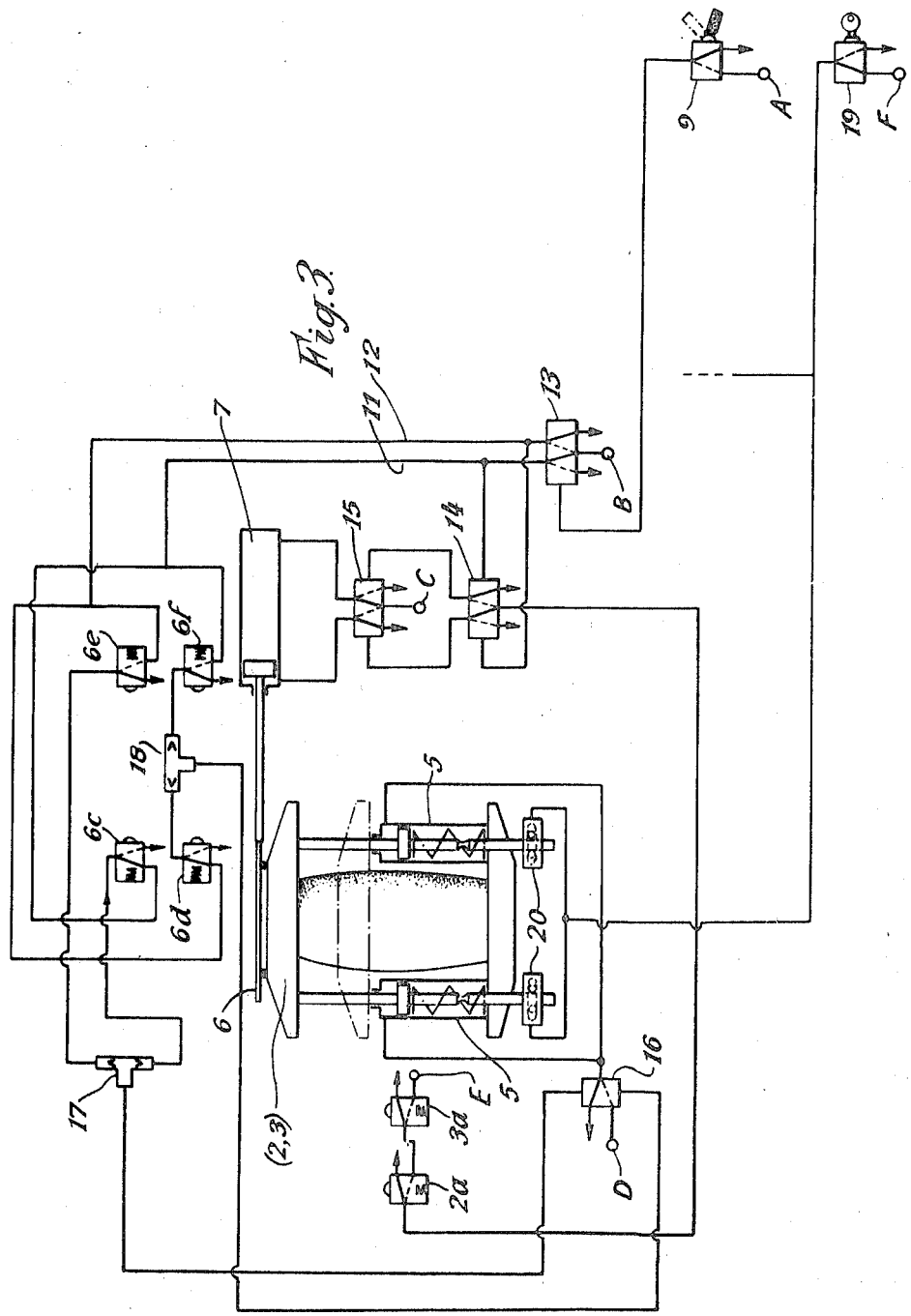

COUPLING STATION

This invention relates to an improved coupling station for connecting an air duct to an airport of an insulated cargo container.

In the containerized transport of cargo it has been proposed to couple an air duct, fed with conditioned air from an air-processing plant, to an inlet port of an insulated cargo container and thus to place the cargo within the container in direct communication with the processing plant. Normally each container is provided with an inlet port and an outlet port so that each coupling station usually requires a supply duct (for connection to the inlet port), a return duct (for connection to the outlet port) and means to couple the ducts to the respective ports.

Where a plurality of coupling stations are fed from a common air-processing plant (e.g., in the hold of a ship or at a land-based container storage area) it is necessary to provide an arrangement for closing the duct or ducts of any station not coupled to a container. Further, when the coupling stations employ expansible coupling members it is desirable to protect the coupling members associated with each duct to each coupling station from damage during movement of a container into or out of its coupling position relative to the coupling station.

This invention relates to a coupling station having at least one expansible coupling member and means for sealing off the coupling member or coupling members when a container is not coupled thereto and for protecting the coupling member or members during movement of a container relative to the coupling station.

According to the invention a coupling station comprises a frame, an open-ended coupling member mounted on the frame expansible in the direction of airflow therethrough between retracted and extended positions, first motive means for moving the coupling member between said positions, a closure plate mounted on the frame for movement in a plane substantially normal to the directions of expansion and retraction of the coupling member and located between said retracted and extended positions, and second motive means for moving the closure plate between an "open" position in which the closure plate lies to one side of the coupling member and a "closed" position in which the closure plate lies in front of the coupling member.

Preferably the coupling station comprises two open-ended coupling members mounted within the frame, one above the other, a single closure plate serving to seal off both coupling members in its closed position and to leave both coupling members unobstructed in its open position.

Any convenient motive means may be used for moving the coupling member, or members and the closure plate, but preferably these are pneumatic or hydraulic cylinder assemblies.

A preferred form of coupling station in accordance with the invention is provided with means to ensure automatic operation whereby actuation of an initiating control member in one direction serves to seal off the coupling member or coupling members if they were originally open and movement of the initiating member in the other direction serves to open the coupling member or members if they were closed.

Figure 2:
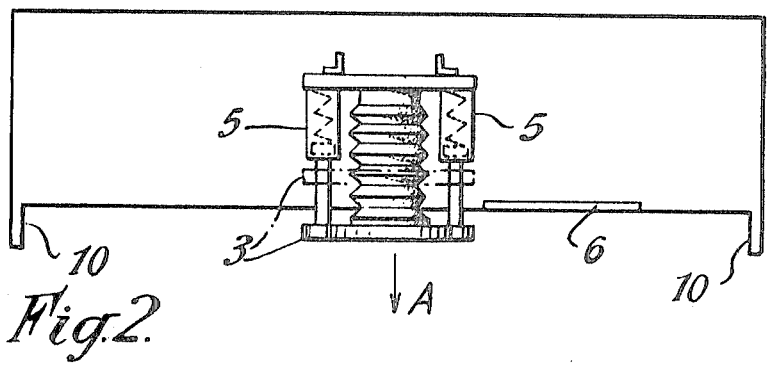

One embodiment of coupling station in accordance with the invention will now be described, by way of example, with reference to the accompanying drawing, in which:

FIG. 1 is a schematic front elevation of the coupling station,
FIG. 2 is a section on the line II–II of FIG. 1, and
FIG. 3 is a schematic diagram of one form of control circuit employed in the coupling station of FIGS. 1 and 2.

Referring to FIGS. 1 and 2 of the drawing, a coupling station comprises a rectangular frame 1 supporting two open-ended coupling members 2 and 3 mounted on the frame and expansible in the direction of airflow therethrough (i.e., the direction of the arrow "A" shown in FIG. 2). In FIG. 2 the extended position of the coupling member 3 is shown in full lines and the retracted position is shown in dotted lines. Any convenient flexible ducting is employed to connect the coupling member with an adjacent air supply or return duct (not shown).

The movement of each coupling member between its retracted and extended position is controlled by pneumatic cylinder assemblies shown as 5, 5 in FIG. 2.

Movably mounted in the frame 1 is a closure plate 6 running in rails 6a and 6b and movable between the "open position" shown in the drawing, in which the closure plate lies to one side of the coupling members, and a "closed position" in which the closure plate lies in front of the coupling members. From FIG. 2 it can be seen that the plane of the closure plate lies between the retracted and extended positions of the coupling members. A pneumatic cylinder assembly 7 is employed to move the closure plate 6 between its open and closed positions.

The pneumatic cylinder assemblies 5 and 7 are coupled together via a control box 8 and an actuating switch 9. The control circuit employed is shown in FIG. 3 and allows fully automatic operation of the coupling station.

Referring to FIG. 3, the various valves shown in the pneumatic control system are illustrated in full lines in the position they would adopt when the switch 9 is in one of its two positions (the "disconnect" position). Broken lines have been employed to show the positions they adopt when the switch 9 is moved into its other position (the "connect" position).

Main air supplies are provided at A, B, C, D, E and F and six sensing valves are provided, one to sense the fully retracted positions of the coupling members 2 and 3 (designated 2a and 3a, respectively), two to sense the closed end position of the closure plate 6 (6c and 6d) and two to sense the open end position of the closure plate 6 (6e and 6f).

The control system is shown in FIG. 3 as it would be with the closure members sealed against the plate 6 (i.e., valves 6c and 6d are tripped but not valves 6e, 6f, 2a and 3a). If the switch 9 is moved to its other position, air from A moves over a valve 13 to switch air from B from a line 11 to a line 12. This has the effect of switching over a valve 14, and via sensing valve 6d and three-way nonreturn valve 18, switching over a valve 16 to admit air from the supply D to the cylinder assemblies 5 to retract the coupling members against the urging of their extending springs.

As soon as the coupling members 2 and 3 trip the valves 2a and 3a, air can flow from the supply E via the switched valve 14 to switch over the valve 15 and move the air supply C to the other end of the cylinder assembly 7 to move the latter into its open position. As the closure plate moves away from its closed position, the valves 6c and 6d are returned to their untripped condition and when the closure plate reaches its open position, valves 6e and 6f are tripped. This moves the valve 16 back to its original position (air from line 2 can no longer pass via valve 6d but can pass via valve 6e and a nonreturn valve 17) to open the cylinder assemblies 5 to atmosphere and allow the extending springs to reexert themselves—untripping the valves 2a and 3a in the process. The system now rests in this position until the switch 9 is returned to the position shown in full lines in FIG. 3.

When this happens, air from B is switched back to the line 11 changing the valve 14 and the valve 16 (via the valve 6f and the nonreturn valve 18). The coupling members retract (on the supply from D reaching the cylinder assemblies 5) and when 2a and 3a are tripped, the air from E switches the valve 15 over to move the closure plate 6 into its closed position. When the valve 6c is tripped, the valve 16 moves again to cut off air to the cylinder assemblies 5 and allow the closure members to extend.

Thus if the station is in the position shown in FIG. 1, (i.e., the coupling members are open and extended) actuation of the switch 9 first causes the coupling members 2 and 3 to be retracted, then causes the closure plate 6 to move along the rails 6a and 6b until it lies in front of the coupling members 2 and 3 and finally extends the coupling members so that they seal against the closure plate 6.

If, however, the coupling station is originally in the position in which the closure plate 6 is sealing off the coupling members 2 and 3, actuation of the switch 9 first causes retraction of the coupling members 2 and 3, then movement of the closure plate to the "open" position and finally extension of the coupling members forwardly of the plane of the closure plate 6.

Flanges 10 can be provided on the front face of the frame 1 to facilitate correct placement of a container in front of the coupling members.

It will be appreciated that the closure station shown in the drawing can be equally well employed in the hold of a ship or on a land-based storage area.

As well as providing means for sealing off the coupling members when not required, it will be appreciated that the positioning of the closure plate 6 in front of the coupling members 2 and 3 protects the latter from damage when a container is moved into position (normally from above) between the flanges 10.

FIG. 3 also shows a key-actuated valve 19 which controls an air supply F. Locking devices 20 are provided on each coupling member and when pressurized these devices serve to lock the coupling member in its fully retracted position. The devices 20 may include balls which can be pressure-urged (by the supply F) against the shafts on which the coupling members move, these shafts being provided with indents into which the balls will lock when the coupling members are fully retracted.

What is claimed is:

1. A coupling station for coupling an air duct to a port of a cargo container comprising, in combination, a stationary frame defining a reference plane against which a wall of the container provided with said port is adapted to abut; at least one open-ended annular coupling member having an annular end face movable in direction substantially normal to said plane between a retracted position on one side of said plane and an extended position in which said end face abuts against the wall of a container at said reference plane to thus establish communication between said coupling member and the port of the container; first motive means for moving said coupling member between said positions thereof; a closure plate mounted on said frame externally of said coupling member for movement in said reference plane; and second motive means for moving said closure plate between an open position laterally spaced from said end face of said coupling member and a closed position in front of and engaged by said end face of said coupling member for closing the latter in the absence of a cargo container in front of said coupling member.

2. A coupling station as defined in claim 1, and including a pair of flanges projecting from opposite sides of said frame beyond said reference plane toward the other side thereof for properly locating a cargo container on said frame.

3. A coupling station as defined in claim 1, and including guide rail means on said frame for guiding said closure plate during the movement thereof.

4. A coupling station as defined in claim 1, and including means to interlock the movement of said closure plate and that of said coupling member so that said closure plate can move to said closed position only when said coupling member is in said retracted position.

5. A coupling station as defined in claim 4, said interlocking means comprising automatic control means movable between a first and a second position for acting, when moved from said second to said first position, on said first motive means to first effect retraction of said coupling member, for acting then on said second motive means to effect movement of said closure plate to said open position, and to finally act again on said first motive means to effect extension of said coupling member, whereas when moved from said first to said second position, said control means first acts on said first motive means to move said coupling member to said retracted position, then acts on said second motive means to move said closure plate to said closed position and finally extends said coupling member so that said end face engages said closure plate.

6. A coupling station as defined in claim 1, and including locking means on said coupling member for maintaining the latter in said retracted position.

7. A coupling station as defined in claim 1, wherein a pair of said coupling members are mounted on said frame spaced from each other and each provided with first motive means for moving the respective coupling member between said positions thereof, and wherein said closure plate in said closed position thereof extends over the end face of each of said coupling member and is engaged by the same.

8. A coupling station as defined in claim 1, wherein said first motive means comprises fluid-operated cylinder and piston means connected to said coupling member and spring means in the cylinder and acting on said piston of said cylinder and piston means and being biased to move said coupling member to said extended position, and including releasable locking means for holding said coupling member in said retracted position against the force of said spring means.

* * * * *